US012780646B1

(12) United States Patent
Rosales, Jr. et al.

(10) Patent No.: US 12,780,646 B1
(45) Date of Patent: Nov. 3, 2026

(54) SADDLE TREE

(71) Applicant: Welhausen Legacy, LLC, Shiner, TX (US)

(72) Inventors: Armando Rosales, Jr., Yoakum, TX (US); Darrell F. Nephew, III, Eads, TN (US); Reed E. Trevino, Yoakum, TX (US); Michael J. Etzler, Hallettsville, TX (US); Amy L. Orsak, Shiner, TX (US)

(73) Assignee: Welhausen Legacy, LLC, Shiner, TX (US)

( * ) Notice: Subject to any disclaimer, the term of this patent is extended or adjusted under 35 U.S.C. 154(b) by 0 days.

(21) Appl. No.: 19/388,172

(22) Filed: Nov. 13, 2025

(51) Int. Cl.
*B68C 1/02* (2006.01)

(52) U.S. Cl.
CPC .................................. *B68C 1/025* (2013.01)

(58) Field of Classification Search
CPC .. B68C 1/025; B68C 1/02; B68C 1/04; B68C 1/12
See application file for complete search history.

(56) References Cited

U.S. PATENT DOCUMENTS

| | | | | |
|---|---|---|---|---|
| 3,835,621 | A * | 9/1974 | Gorenschek | B68C 1/02 54/44.7 |
| 5,343,674 | A * | 9/1994 | Brown | B68C 1/04 54/44.1 |
| 6,363,698 | B1 * | 4/2002 | Swain | B68C 1/02 54/44.1 |
| 10,829,363 | B2 * | 11/2020 | Coffin | B68C 1/025 |
| 2005/0120683 | A1 * | 6/2005 | Swain | B68C 1/025 54/44.1 |
| 2013/0318932 | A1 * | 12/2013 | Israel | B68C 1/00 54/66 |
| 2021/0368738 | A1 * | 12/2021 | Conen | B68C 1/14 |

* cited by examiner

*Primary Examiner* — Yvonne R Abbott-Lewis
(74) *Attorney, Agent, or Firm* — Jackson Walker L.L.P.

(57) ABSTRACT

A saddle tree may have a variety of configurations and be made by a variety of techniques. In some implementations, a saddle tree may include a first saddle bar, a second saddle bar, a pommel, and a cantle. The saddle bars may each be configured to extend longitudinally along a different side of a horse's back and have a front end and a rear end. The pommel may be coupled each saddle bar near their front ends, and the cantle may be coupled to each saddle bar near their rear ends. Each saddle bar may each include a rigid portion that extends at least from the pommel to the cantle and a flexible portion that extends from at least underneath the pommel to in front of the pommel and/or a flexible portion that extends from at least underneath the cantle to behind the cantle.

20 Claims, 6 Drawing Sheets

SADDLE TREE

BACKGROUND OF THE INVENTION

Western-style saddles are typically made of an underlying form (i.e., a saddle tree) covered with leather. The saddle tree provides the primary physical structure for the saddle and is typically made of wood or hard plastic. In essence, the saddle tree forms the seating area for the rider and provides the structure to transfer force to the horse's back, which is typically accomplished by two longitudinal plates that are place on either side of the horse's spine. The saddle tree also has various attachment points for other items for the saddle (e.g., the girt, the reeling strap and the stirrups).

Typically saddle trees, especially on western-style saddles, are made as entirely rigid structures. This is because they must handle a large amount of force (e.g., the weight of the rider as the horse moves, sometimes up to 40 miles per hour). Moreover, a rider may tie a rope to the saddle (e.g., around the horn) and use the other end of the rope to drag various items (e.g., calves, steers, or logs). Thus, the saddle tree must handle a large amount of varying forces.

SUMMARY

In one example implementation, a saddle tree in accordance with the present invention may include a first saddle bar, a second saddle bar, a pommel, and a cantle. The first saddle bar may be configured to extend longitudinally along a first side of a horse's back and include a front end and a rear end and a top side and a bottom side. Similarly, the second saddle bar may be configured to extend longitudinally along a second side of a horse's back and include a front end and a rear end and a top side and a bottom side. The pommel may be coupled to the top side of the first saddle bar near the front end of the first saddle bar and to the top side of the second saddle bar near the front end of the second saddle bar. The cantle may be coupled to the top side of first saddle bar near the rear end of the first saddle bar and to the top side of the second saddle bar near the rear end of the second saddle bar. The first saddle bar may include a rigid portion that extends at least from the pommel to the cantle and a first flexible portion that extends from at least underneath the pommel to in front of the pommel. The second saddle bar may include a rigid portion that extends at least from the pommel to the cantle and a second flexible portion that extends from at least underneath the pommel to in front of the pommel.

In some implementations, the rigid portion of the first saddle bar may include a front end and a rear end, and the bottom side of the first saddle bar may be recessed in thickness near its front end by the thickness of the first flexible portion to receive a rear portion of the first flexible portion. The first flexible portion may include a front portion that extends beyond the front end of the first saddle bar and the pommel. In certain implementations, the recess of the first saddle bar may extend underneath the pommel.

The front portion of the first flexible portion may, for example, have an oval shape. Additionally, the front portion of the first flexible portion may include an aperture for receiving a saddle accoutrement. The front portion of the first flexible portion may be wider than the front end of the first saddle bar.

In particular implementations, the first saddle bar may include a third flexible portion that extends from at least underneath the cantle to behind the cantle, and the second saddle bar may include a fourth flexible portion that extends from at least underneath the cantle to behind the cantle. In certain implementations, the rigid portion of the first saddle bar may have a front end and a rear end, and the bottom side of the first saddle bar may be recessed in thickness near its rear end by the thickness of the third flexible portion to receive a front portion of the third flexible portion. The third flexible portion may include a rear portion that extends beyond the rear end of the first saddle bar and the cantle.

In some implementations, the front portion of the third flexible portion may be wider than the rear end of the first saddle bar. Additionally, the rear portion of the third flexible portion may include an aperture for receiving a saddle accoutrement.

In another example implementation in accordance with the present invention, a saddle tree may include a first saddle bar, a second saddle bar, a pommel, and a cantle. The first saddle bar may be configured to extend longitudinally along a first side of a horse's back and have a front end and a rear end and a top side and a bottom side. The second saddle bar may be configured to extend longitudinally along a second side of a horse's back and have a front end and a rear end and a top side and a bottom side. The pommel may be coupled to the top side of the first saddle bar near the front end of the first saddle bar and to the top side of the second saddle bar near the front end of the second saddle bar. The cantle may be coupled to the top side of first saddle bar near the rear end of the first saddle bar and to the top side of the second saddle bar near the rear end of the second saddle bar. The first saddle bar may include a rigid portion that extends at least from the pommel to the cantle and a first flexible portion that extends from at least underneath the cantle to behind the cantle. The second saddle bar may include a rigid portion that extends at least from the pommel to the cantle and a second flexible portion that extends from at least underneath the cantle to behind the cantle.

In certain implementations, the rigid portion of the first saddle bar may include a front end and a rear end, and the bottom side of the first saddle bar may be recessed in thickness near its rear end by the thickness of the first flexible portion to receive a front portion of the first flexible portion. Additionally, the first flexible portion may include a rear portion that extends beyond the rear end of the first saddle bar and the cantle.

The recess of the first saddle bar may, for example, extend underneath the cantle. Furthermore, the rear portion of the first flexible portion may include an aperture for receiving a saddle accoutrement. Moreover, the front portion of the first flexible portion may be wider than the rear end of the first saddle bar.

In particular implementations, the first saddle bar may include a third flexible portion that extends from at least underneath the pommel to in front of the pommel, and the second saddle bar may include a fourth flexible portion that extends from at least underneath the pommel to in front of the pommel. Additionally, the rigid portion of the first saddle bar may include a front end and a rear end, and the bottom side of the first saddle bar may be recessed in thickness near its rear end by the thickness of the third flexible portion to receive a rear portion of the third flexible portion. Furthermore, the third flexible portion may include a front portion that extends beyond the front end of the first saddle bar and the cantle.

The front portion of the third flexible portion may, for example, have an oval shape. Additionally, the front portion of the third flexible portion may be wider than the front end of the first saddle bar. In some implementations, the front portion of the third flexible portion may include an aperture for receiving a saddle accoutrement.

Various implementations may include one or more features. For example, the flexible portions of the saddle bars may dampen the movement of a saddle (i.e., act as shock absorber). Additionally, the flexible portions may provide relief for the horse at the pressure points where the tips rest upon the horse (e.g., on the withers for the front flexible portions and on the loins for the rear flexible portion). Additionally, the shape of the flexible portions can facilitate attachment of the skirt when forming a saddle. Additional features will be evident to those skilled in the art in light of the following written description and figures.

BRIEF DESCRIPTION OF THE DRAWINGS

For a more complete understanding of the present invention and its implementations, and the features thereof, reference is now made to the following descriptions taken in conjunction with the accompanying drawings, in which.

DETAILED DESCRIPTION

While the inventive concepts are much more basic than any particular implementation, those skilled in the art can gather an appreciation for some of the possible benefits of the broader concepts and possible interplay between various elements of the concepts in the course of considering example implementations, some of which are described in detail below. Note that various components from different implementations may be used together to generate other implementations as long as there is not some physical impracticability in doing so.

Figure 1:
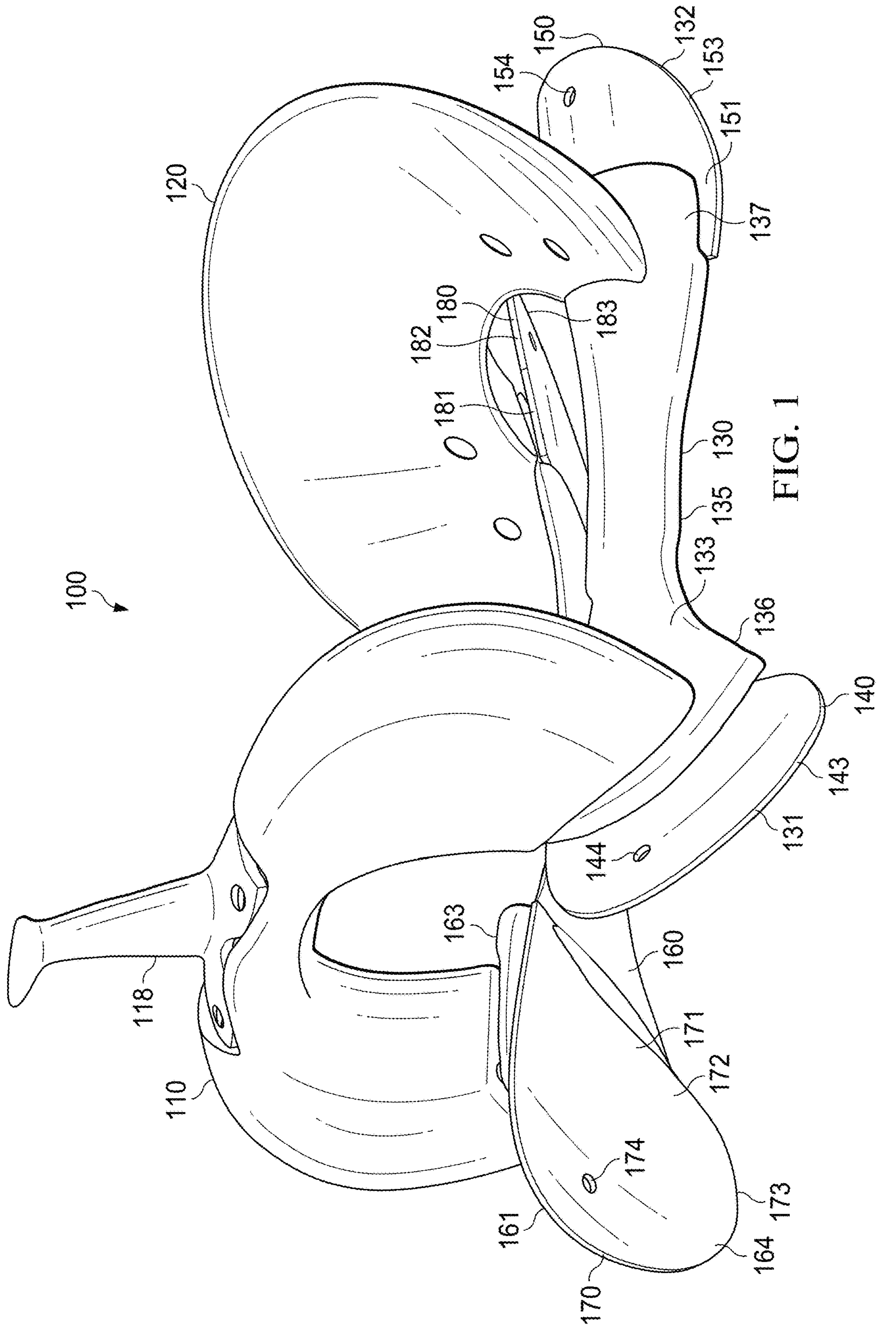
FIG. 1 is a line drawing illustrating a three-dimensional view of an example saddle tree in accordance with one embodiment the invention.
Figure 2:
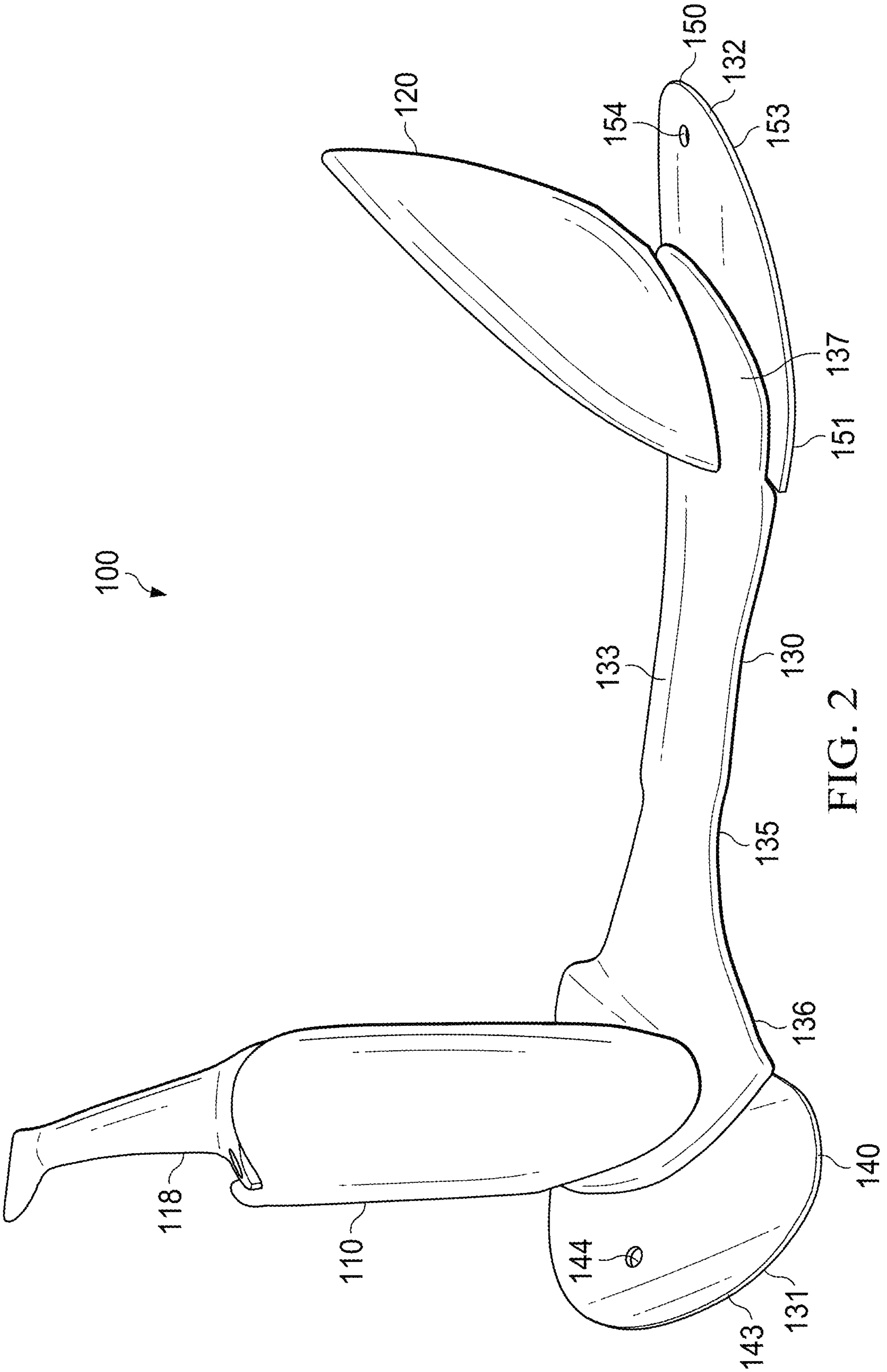
FIG. 2 is a line drawing illustrating a side view of the example saddle tree in FIG. 1.
Figure 3:
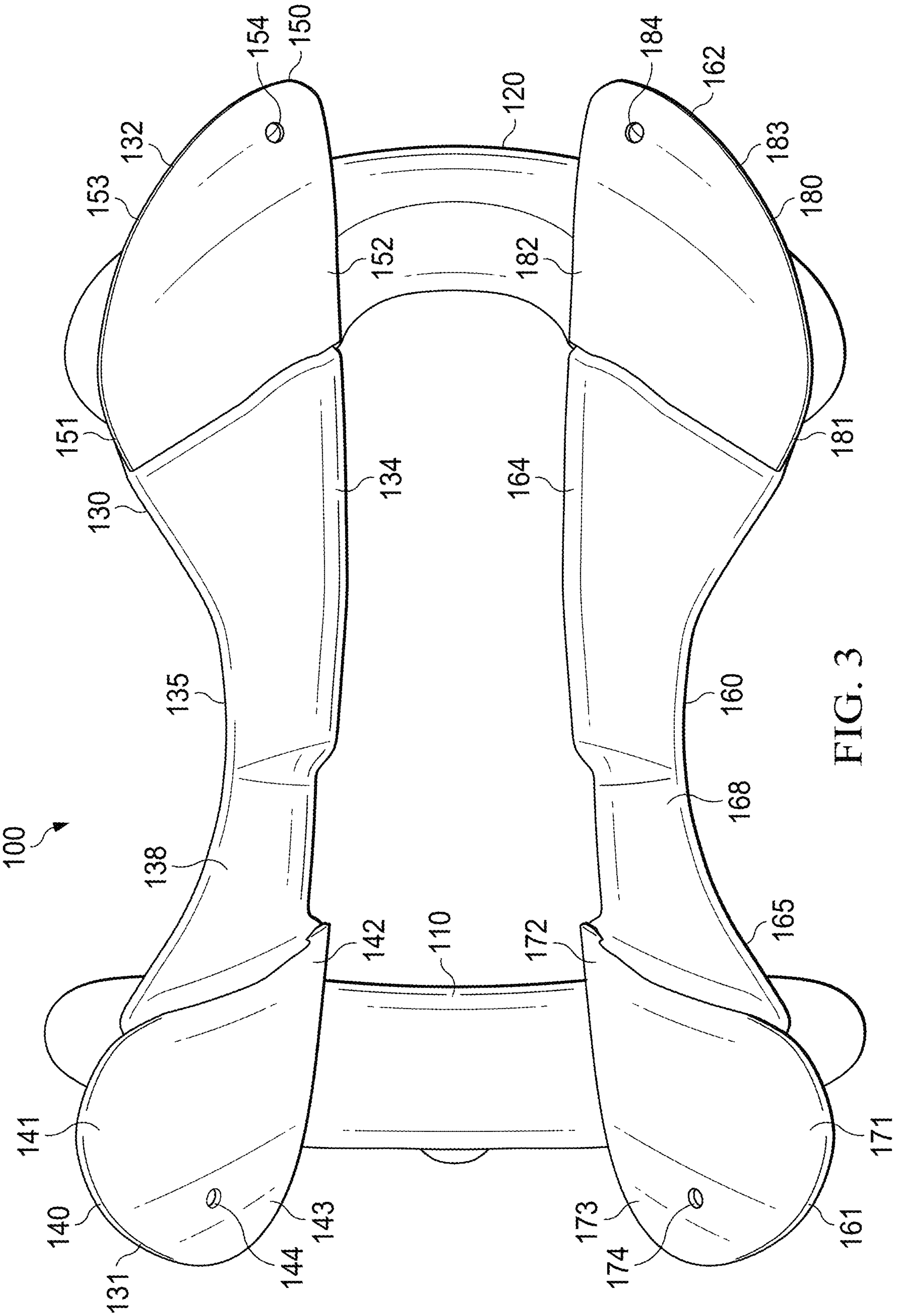
FIG. 3 is a line drawing illustrating a bottom view of the example saddle tree in FIG. 1

FIGS. 1-3 illustrate an example saddle tree 100 in accordance with one embodiment of the invention. As illustrated, saddle tree 100 is primarily composed of a pommel 110, a cantle 120, a first saddle bar 130, and a second saddle bar 160. Saddle tree 100 is typically covered in a material (e.g., leather or fabric) when it is incorporated into a saddle. Saddle tree 100 may include other features in other embodiments.

Saddle bars 130, 160 are configured to extend along the back of a horse (one on each side of the spine) and pommel 110 and cantle 120 are each coupled to a top surface 133 and a top surface 163 thereof. Thus, the saddle bars provide the primary support between the horse's back and the rest of the saddle tree. In some implementations, the rigid portion of saddle bars 130, 160 may be covered with a sealing spray (e.g., a two-part polyurethane spray), which will further thicken the saddle bars.

First saddle bar 130 generally includes a front end 131, a rear end 132, a top surface 133, and a bottom surface 134 and is elongated between front end 131 and rear end 132. That is, first saddle bar 130 is much longer than it is wide (e.g., by 4-8 times). First saddle bar 130 includes a rigid portion 135, a first flexible portion 140, and a second flexible portion 150.

Rigid portion 135 is itself generally elongated (e.g., by 3-6 times) and includes a front end 136, a rear end 137, and a bottom surface 138. Rigid portion 135 may constructed from any appropriate rigid material (e.g., wood or plastic).

First flexible portion 140 is coupled to bottom surface 138 of first saddle bar 130 near front end 136 and extends forward beyond front end 136 and pommel 110. Additionally, second flexible portion 150 is coupled to bottom surface 138 of first saddle bar 130 near rear end 137 and extends reward beyond rear end 137 and cantle 120. The flexible portions may, for example, be made of low density plastic or any other appropriate flexible and/or compressible material.

First flexible portion 140 includes a rear portion 141, a front portion 143, and a bottom surface 142. Rear portion 141 is coupled to bottom surface 138 of first saddle bar 135 under pommel 110, and front portion 143 extends forward past first end 136 of first saddle bar 135 and pommel 110. Rear portion 141 may be coupled to first saddle bar 135 by any of a variety of fasteners (e.g., screws, rivets, adhesive, etc.). The top edge of rear portion 141 may be trimmed so that it follows the curvature of the top edge of first saddle bar 135 to the front edge of the first saddle bar. The top edge of rear portion 141 may also be beveled so that it transitions smoothly to the top edge of first saddle bar 135. In particular implementations, first flexible portion 140 is approximately 3/16 of an inch thick and is screwed into front end 136 of saddle bar 135 from underneath (i.e., with the screw heads facing down). Rear portion 141 generally has the same shape as the bottom surface 138 of first saddle bar 135 where rear portion engages bottom surface 138, and front portion 143 has an oval shape in this implementation, but may have other shapes in other implementations. Front portion 143 includes an aperture 144 for securing various components of a saddle (e.g., conchos or rigging straps) thereto.

Second flexible portion 150 includes a front portion 151, a rear portion 153, and a bottom surface 152. Front portion 151 is coupled to bottom surface 138 of first saddle bar 135 under cantle 120, and rear portion 153 extends rearward from second end 137 of first saddle bar 135 and cantle 120. Front portion 151 may be coupled to first saddle bar 135 by any of a variety of fasteners (e.g., screws, rivets, adhesive, etc.). In particular implementations, second flexible portion 150 is approximately 3/16 of an inch thick and is screwed into rear end 137 of saddle bar 135 from underneath (i.e., with the screw heads facing down). Front portion 151 generally has the same shape as the bottom surface 138 of first saddle bar 135 where rear portion engages the bottom surface, except that front portion 151 may be slightly wider than rear end 137 of first saddle bar 135 (e.g., by about 0.125 inches). In some implementations, the bottom edge of front portion 151 may be trimmed (e.g., beveled) so that it the front portion smoothly transitions with the bottom edge of second end 137. As illustrated, the outer edge of second portion 153 has a generally arcuate shape, but it may have other shapes in other implementations. Rear portion 153 includes an aperture 154 for securing various components of a saddle (e.g., conchos or rigging straps) thereto.

In this implementation, the overlap of rear portion 141 of first flexible portion 140 with front end of 136 of first saddle bar 135 may be approximately 6 and 1/8 inches at the longest point and 3 and 3/8 inches at the shortest point. The overlap of front portion 152 of second flexible portion 150 with rear end of 137 of first saddle bar 135 may be approximately 5 and 5/8 inches at the longest point and 3 and 7/8 inches at the shortest point. But other overlaps may be used in other implementations.

As can best be seen in FIG. 3, front end 136 of first saddle bar 135 is recessed (e.g., by molding or milling) on bottom surface 138 where first saddle bar 135 is coupled to rear portion 141 of first flexible portion 140. Thus, the transition from bottom surface 142 of first flexible member 140 to bottom surface 138 of rigid portion 135 may be relatively smooth.

Similarly, rear end 137 of first saddle bar 135 is recessed on bottom surface 138 where first saddle bar 135 is coupled to front portion 141 of second flexible portion 140. Thus, the transition from bottom surface 152 of second flexible portion 150 to bottom surface 138 of rigid portion 135 may be relatively smooth.

In a similar fashion, second saddle bar 160 includes a front end 161, a rear end 162, a top surface 163, and a bottom surface 164 and is elongated between front end 161 and rear end 162. That is, second saddle bar 160 is much longer than it is wide (e.g., by 4-8 times). Second saddle bar 160 includes a rigid portion 165, a first flexible portion 170, and a second flexible portion 180.

Rigid portion 165 is itself generally elongated (e.g., by 3-6 times) and includes a front end 166, a rear end 167, and a bottom surface 168. First flexible portion 170 is coupled to bottom surface 168 of second saddle bar 160 near front end 166 and extends forward beyond front end 166 and pommel 110. Additionally, second flexible portion 180 is coupled to bottom surface 168 of second saddle bar 160 near rear end 167 and extends reward beyond rear end 167 and cantle 120.

First flexible portion 170 includes a rear portion 171, a front portion 173, and a bottom surface 172. Rear portion 171 is coupled to bottom surface 168 of second saddle bar 165 under pommel 110, and front portion 173 extends forward past first end 166 of first saddle bar 165 and pommel 110. Rear portion 171 may be coupled to second saddle bar 165 by any of a variety of fasteners (e.g., screws, rivets, adhesive, etc.). The top edge of rear portion 171 may be trimmed so that it follows the curvature of the top edge of second saddle bar 165 to the front edge of the second saddle bar. The top edge of rear portion 171 may also be beveled so that it transitions smoothly to the top edge of second saddle bar 165. Rear portion 171 generally has the same shape as the bottom surface 168 of second saddle bar 165 where rear portion 171 engages bottom surface 168, and front portion 163 has an oval shape, but may have other shapes in other implementations. Front portion 173 includes an aperture 174 for securing various components of a saddle (e.g., conchos or rigging straps) thereto.

Second flexible portion 180 includes a front portion 181, a rear portion 183, and a bottom surface 182. Front portion 181 is coupled to bottom surface 168 of first saddle bar 165 under cantle 120, and rear portion 183 extends rearward past second end 167 of second saddle bar 165 and cantle 120. Front portion 181 may be coupled to second saddle bar 165 by any of a variety of fasteners (e.g., screws, rivets, adhesive, etc.). Front portion 181 generally has the same shape as bottom surface 168 of first saddle bar 165 where front portion 181 engages bottom surface 168, except that front portion 181 is wider than second end 167 of second saddle bar 165 (e.g., by about 0.125 inches). In some implementations, the bottom edge of front portion 181 may be trimmed (e.g., beveled) so that it the front portion smoothly transitions with the bottom edge of second end 167. As illustrated, the outer edge of second portion 183 has a generally arcuate shape, but may have other shapes in other implementations. Rear portion 183 includes an aperture 184 for securing various components of a saddle (e.g., conchos or rigging straps) thereto.

Pommel 110 is coupled to front end 136 of first saddle bar 135 and front end 166 of second saddle bar 165. Thus, pommel 110 keeps front ends 136, 156 from moving away from each other. The coupling between pommel 110 and first saddle bar 135 and/or second saddle bar 165 may be accomplished by any appropriate fasteners (e.g., screws, adhesive, rivets, etc.).

As illustrated, pommel 110 is arched, but it may have other configurations. Additionally, on top of pommel 110 is a horn 118. Pommel 110 may be made of any appropriate material (e.g., wood or plastic).

Cantle 120 is coupled to rear end 137 of first saddle bar 135 and rear end 167 of second saddle bar 165. Thus, cantle 120 keeps rear ends 137, 167 from moving away from each other. The coupling between cantle 120 and first saddle bar 135 and/or second saddle bar 165 may be accomplished by any appropriate fasteners (e.g., screws, adhesive, rivets, etc.). Cantle 120 may be made of any appropriate material (e.g., wood or plastic).

As can best be seen in FIG. 3, front end 166 of second saddle bar 165 is recessed on bottom surface 168 where second saddle bar 165 is coupled to rear portion 171 of first flexible portion 170. Thus, the transition from bottom surface 172 of first flexible portion 170 to bottom surface 188 of rigid portion 185 may be relatively smooth.

Similarly, rear end 166 of second saddle bar 165 is recessed on bottom surface 168 where second saddle bar 165 is coupled to front portion 181 of second flexible portion 180. Thus, the transition from bottom surface 182 of second flexible portion 180 to bottom surface 168 of rigid portion 165 may be relatively smooth.

Figure 4:
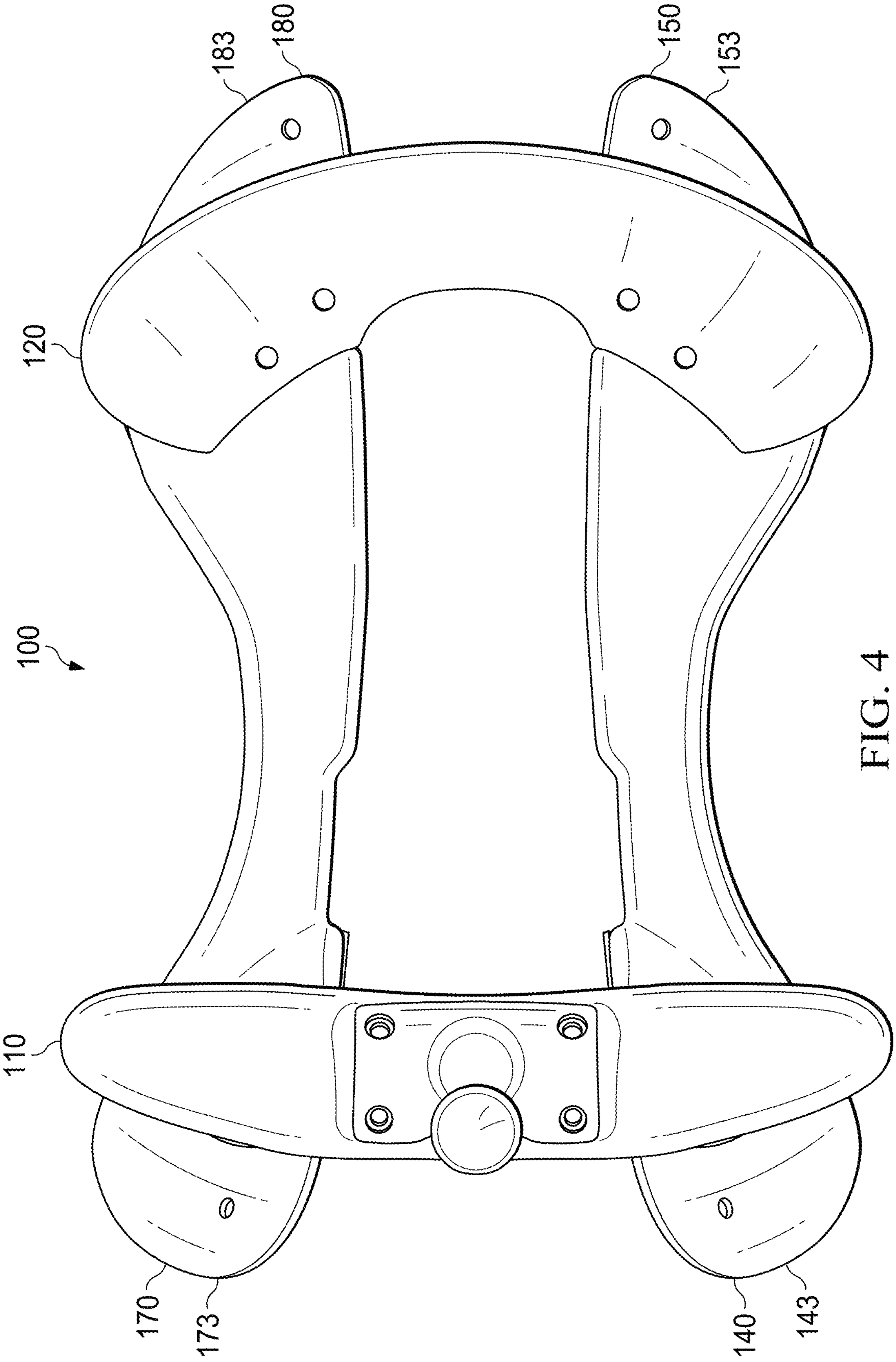
FIG. 4 is a line drawing illustrating a top view of the example saddle tree in FIG. 1.

FIG. 4 illustrates a top view of the example saddle tree of saddle tree 100. This view illustrates more clearly the extent to which second portion 143 of first flexible member 140 and second portion 173 of first flexible member 170 extend past pommel 110. Additionally, this view illustrates more clearly the extent to which second portion 153 of second flexible member 150 and second portion 183 of second flexible member 180 extend past cantle 120.

Figure 5:
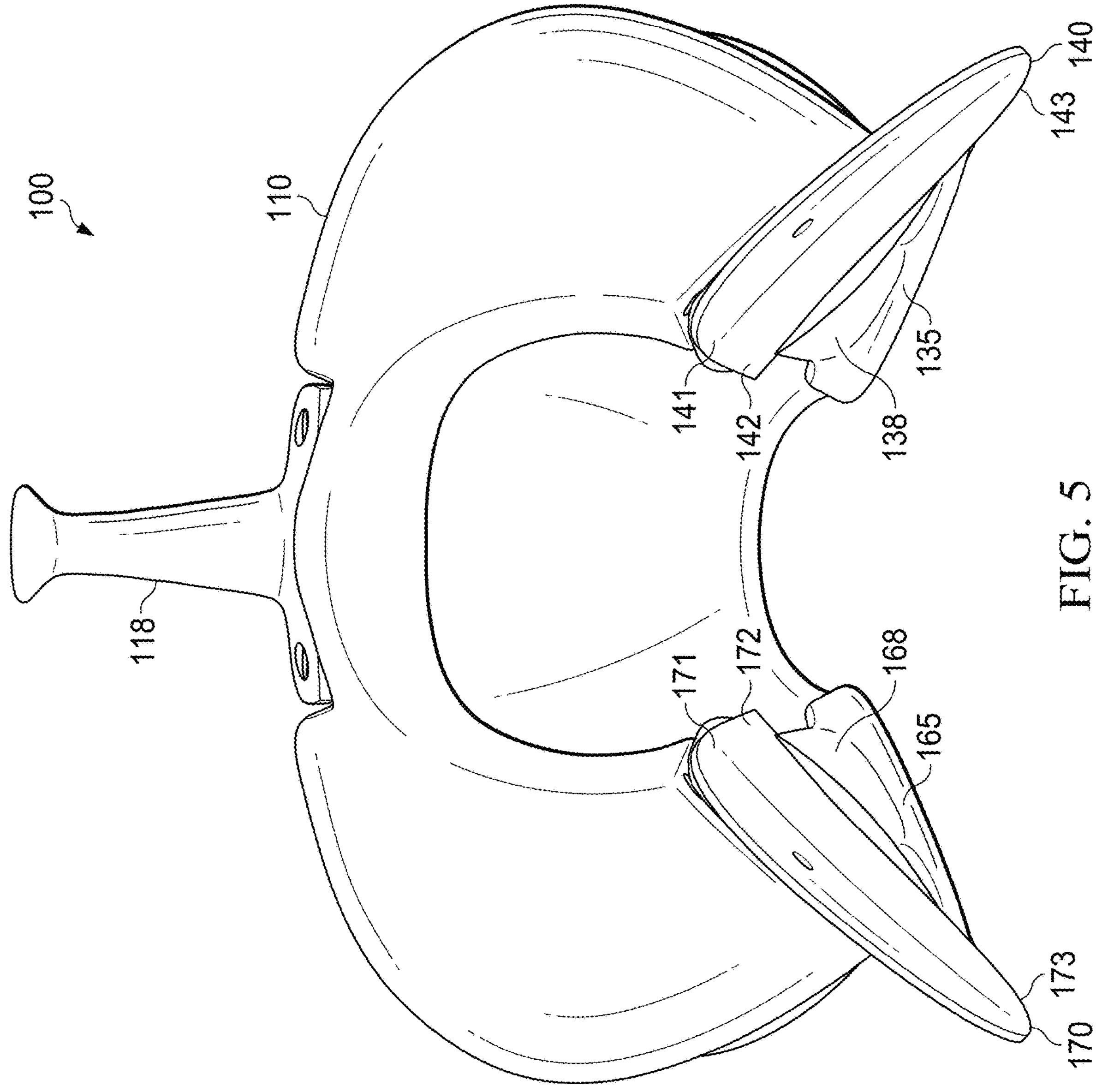
FIG. 5 is a line drawing illustrating a front view of the example saddle tree in FIG. 1.

FIG. 5 illustrates a front view of saddle tree 110. As can be seen, the rear portions 141, 171 of first flexible portions 140, 170 match the shape of first saddle bar 135 and second saddle bar 165 where the flexible portions overlap with the saddle bars. Additionally, bottom surfaces 142, 172 of flexible portions 140, 170 are aligned with bottom surfaces 138, 168 of the saddle bars. Thus, there is a smooth transition between the bottom surfaces of the saddle bars and the bottom surfaces of the flexible portions. In some implementations, a sealing spray on first saddle bar 135 may further aid this transition. Furthermore, the extent to which front portions 143, 173 extend laterally past the saddle bars can be observed.

Figure 6:
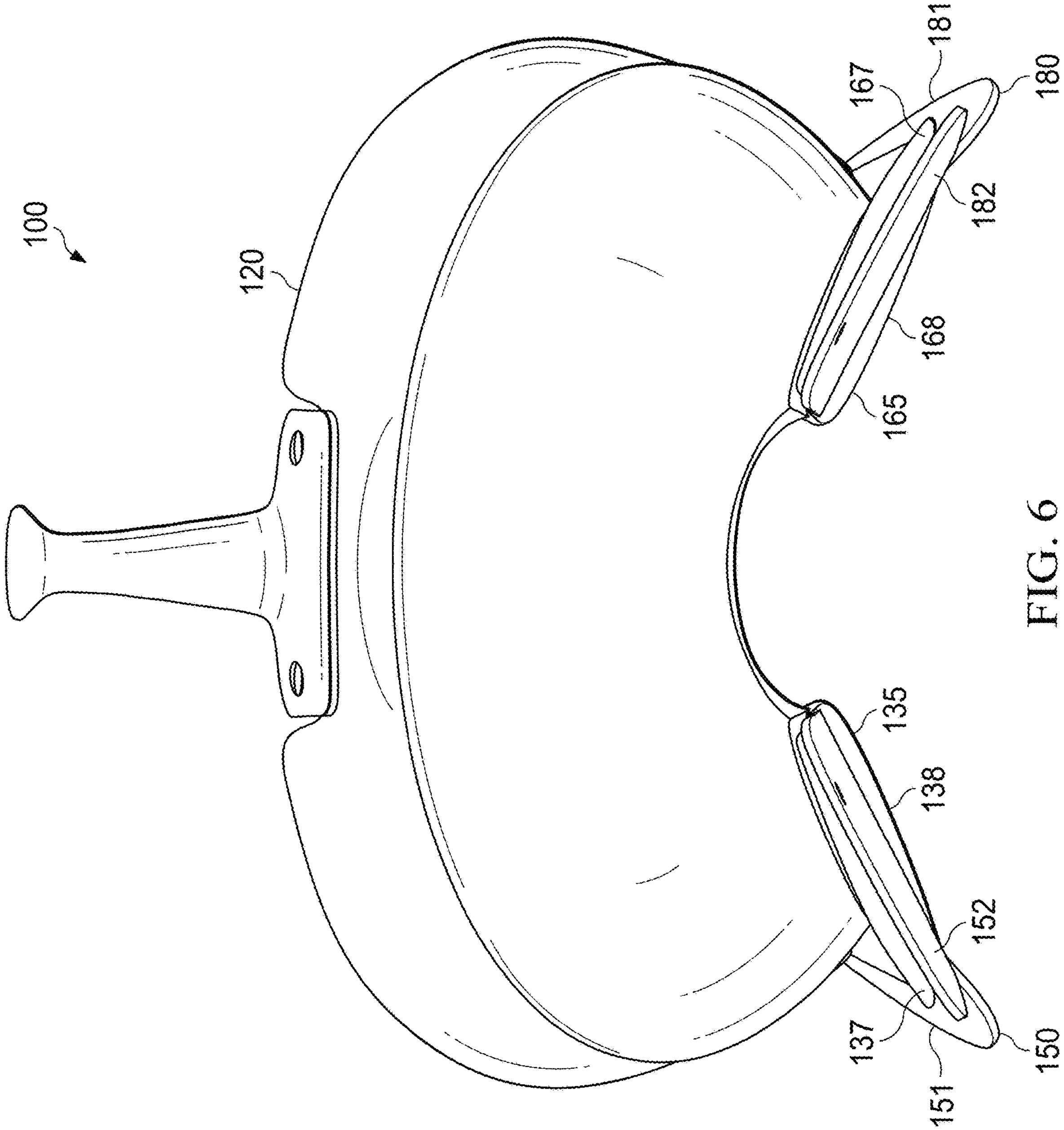
FIG. 6 is a line drawing illustrating a rear view of the example saddle tree in FIG. 1.

FIG. 6 illustrates a rear view of saddle tree 110. As can be seen, the front portions 151, 181 of second flexible portions 150, 180 are approximately the same thickness as the recess in rear ends 137, 157 of first saddle bar 135 and second saddle bar 155. Thus, the bottom surfaces 152, 182 of flexible portions 150, 180 are aligned with bottom surfaces 138, 168 of the saddle bars. Thus, there is a smooth transition between the bottom surfaces of the saddle bars and the bottom surfaces of the second flexible portions. In some implementations, a sealing spray on second saddle bar 155 may further aid this transition. Furthermore, the extent to which front portions 151, 181 extend laterally past the saddle bars can be observed.

Saddle tree 100 includes a variety of features. For example, the flexible portions of the saddle bars dampen the movement of a saddle (i.e., act as shock absorber). Additionally, the flexible portions provide relief for the horse at the pressure points where the tips rest upon the horse. Additionally, the shape of the flexible portions can facilitate attachment of the skirt when constructing a saddle.

The drawings shown herein are believed to provide fairly accurate representations of the illustrated implementations, and for some implementations, the drawings are to scale. Thus, lengths, angles, relative sizes, positioning of parts, orientation of parts, and like information can be readily extracted therefrom by one of skill in the art. However, the invention is not limited to the exact dimensions/sizes shown (e.g., bend radiuses, angles, etc. may need to be adjusted for various implementations).

A number of implementations for a saddle tree have been shown and discussed, and several others have mentioned or been suggested. Moreover, those of ordinary skill in the art will readily recognize that a variety of additions, deletions, substitutions, and transformations may be made while still achieving a saddle tree. Thus, the scope of protected matter should be judged based on the claims, which may encompass one of more aspects of one of more implementations.

The invention claimed is:

1. A saddle tree comprising:

a first saddle bar configured to extend longitudinally along a first side of a horse's back, the first saddle bar having a front end and a rear end and a top side and a bottom side;

a second saddle bar configured to extend longitudinally along a second side of a horse's back, the second saddle bar having a front end and a rear end and a top side and a bottom side;

a pommel coupled to the top side of the first saddle bar near the front end of the first saddle bar and to the top side of the second saddle bar near the front end of the second saddle bar; and a cantle coupled to the top side of the first saddle bar near the rear end of the first saddle bar and to the top side of the second saddle bar near the rear end of the second saddle bar;

wherein the first saddle bar comprises a rigid portion that extends at least from the pommel to the cantle and a first flexible portion that extends from at least underneath the pommel to in front of the pommel; and wherein the second saddle bar comprises a rigid portion that extends at least from the pommel to the cantle and a second flexible portion that extends from at least underneath the pommel to in front of the pommel.

2. The saddle tree of claim 1, wherein the rigid portion of the first saddle bar has a front end and a rear end and the bottom side of the first saddle bar is recessed in thickness near its front end by the thickness of the first flexible portion to receive a rear portion of the first flexible portion, the first flexible portion comprising a front portion that extends beyond the front end of the first saddle bar and the pommel.

3. The saddle tree of claim 2, wherein the recess of the first saddle bar extends underneath the pommel.

4. The saddle tree of claim 2, wherein the front portion of the first flexible portion comprises an oval shape.

5. The saddle tree of claim 2, wherein the front portion of the first flexible portion comprises an aperture for receiving a saddle accoutrement.

6. The saddle tree of claim 2, wherein the front portion of the first flexible portion is wider than the front end of the first saddle bar.

7. The saddle tree of claim 1, wherein the first saddle bar comprises a third flexible portion that extends from at least underneath the cantle to behind the cantle, and the second saddle bar comprises a fourth flexible portion that extends from at least underneath the cantle to behind the cantle.

8. The saddle tree of claim 7, wherein the rigid portion of the first saddle bar has a front end and a rear end, and the bottom side of the first saddle bar is recessed in thickness near its rear end by the thickness of the third flexible portion to receive a front portion of the third flexible portion, the third flexible portion comprising a rear portion that extends beyond the rear end of the first saddle bar and the cantle.

9. The saddle tree of claim 8, wherein the front portion of the third flexible portion is wider than the rear end of the first saddle bar.

10. The saddle tree of claim 8, wherein the rear portion of the third flexible portion comprises an aperture for receiving a saddle accoutrement.

11. A saddle tree comprising:

a first saddle bar configured to extend longitudinally along a first side of a horse's back, the first saddle bar having a front end and a rear end and a top side and a bottom side;

a second saddle bar configured to extend longitudinally along a second side of a horse's back, the second saddle bar having a front end and a rear end and a top side and a bottom side;

a pommel coupled to the top side of the first saddle bar near the front end of the first saddle bar and to the top side of the second saddle bar near the front end of the second saddle bar; and a cantle coupled to the top side of first saddle bar near the rear end of the first saddle bar and to the top side of the second saddle bar near the rear end of the second saddle bar;

wherein the first saddle bar comprises a rigid portion that extends at least from the pommel to the cantle and a first flexible portion that extends from at least underneath the cantle to behind the cantle; and wherein the second saddle bar comprises a rigid portion that extends at least from the pommel to the cantle and a second flexible portion that extends from at least underneath the cantle to behind the cantle.

12. The saddle tree of claim 11, wherein the rigid portion of the first saddle bar has a front end and a rear end, and the bottom side of the first saddle bar is recessed in thickness near its rear end by the thickness of the first flexible portion to receive a front portion of the first flexible portion, the first flexible portion comprising a rear portion that extends beyond the rear end of the first saddle bar and the cantle.

13. The saddle tree of claim 12, wherein the recess of the first saddle bar extends underneath the cantle.

14. The saddle tree of claim 12, wherein the rear portion of the first flexible portion comprises an aperture for receiving a saddle accoutrement.

15. The saddle tree of claim 12, wherein the front portion of the first flexible portion is wider than the rear end of the first saddle bar.

16. The saddle tree of claim 11, wherein the first saddle bar comprises a third flexible portion that extends from at least underneath the pommel to in front of the pommel, and the second saddle bar comprises a fourth flexible portion that extends from at least underneath the pommel to in front of the pommel.

17. The saddle tree of claim 16, wherein the rigid portion of the first saddle bar has a front end and a rear end, and the bottom side of the first saddle bar is recessed in thickness near its front end by the thickness of the third flexible portion to receive a rear portion of the third flexible portion, the third flexible portion comprising a front portion that extends beyond the front end of the first saddle bar and the pommel.

18. The saddle tree of claim 17, wherein the front portion of the third flexible portion comprises an oval shape.

19. The saddle tree of claim 18, wherein the front portion of the third flexible portion comprises an aperture for receiving a saddle accoutrement.

20. The saddle tree of claim 17, wherein the front portion of the third flexible portion is wider than the front end of the first saddle bar.

* * * * *